United States Patent [19]

Judeinstein et al.

[11] Patent Number: 4,785,464

[45] Date of Patent: Nov. 15, 1988

[54] METHOD AND DEVICE FOR REGENERATING THE INTEGRITY OF THE BIT RATE IN A PLESIOSYNCHRONOUS SYSTEM

[75] Inventors: André Judeinstein, St. Remy Les Chevreuses; Pierre Lagoutte, Issy Les Moulineaux, both of France

[73] Assignee: LMT Radio Professionnelle, Boulogne Billancourt, France

[21] Appl. No.: 1,164

[22] Filed: Jan. 7, 1987

[30] Foreign Application Priority Data

Jan. 10, 1986 [FR] France .................. 86 00322

[51] Int. Cl.$^4$ .......................................... H04L 25/38
[52] U.S. Cl. ...................................... 375/3; 375/117; 370/48
[58] Field of Search ............... 375/106, 117, 119, 111, 375/3.4; 370/47, 48; 371/38

[56] References Cited

U.S. PATENT DOCUMENTS

| | | | |
|---|---|---|---|
| 4,004,090 | 1/1977 | Goto et al. | 375/119 |
| 4,175,692 | 11/1979 | Watanabe | 371/38 |
| 4,208,650 | 6/1980 | Horn | 375/117 |
| 4,247,935 | 1/1981 | Bodart et al. | 375/117 |
| 4,288,874 | 9/1981 | Yamada | 375/119 |
| 4,306,305 | 12/1981 | Doi et al. | 371/38 |
| 4,697,265 | 9/1987 | Nozue | 375/26 |

Primary Examiner—Robert L. Griffin
Assistant Examiner—Stephen Chin
Attorney, Agent, or Firm—Oblon, Fisher, Spivak, McClelland & Maier

[57] ABSTRACT

The network of the invention comprises, in the transmitter, a "marker" generator which inserts bits of a cyclical sequence into the binary data flow and, in the receiver, a marker processing circuit by which it is possible to identify the start of the marker cycle in order to re-justify the useful data signal in accordance with the detection of this start of a cycle.

17 Claims, 4 Drawing Sheets

METHOD AND DEVICE FOR REGENERATING THE INTEGRITY OF THE BIT RATE IN A PLESIOSYNCHRONOUS SYSTEM

BACKGROUND OF THE INVENTION (1) Field of the Invention

The present invention pertains to a method and a device for regenerating the integrity of the bit rate in a plesiosynchronous (i.e. nearly synchronous) system.

(2) State of the Prior Art

A data communication network or a pulse code modulation (PCM) telephonic network is said to be plesiosynchronous when the switching centers located along the path of a link between two subscribers have bit rates which are unequal yet very close to each another. The result of this is that each center sends its immediate neighbour a little more or a little less data than the latter is capable of handling. The reception will be said to be hyposynchronous when the clock frequency of the receiver is slightly lower than that of the transmitter, and the receiver will therefore necessarily lose data. In the opposite situation, the reception will be called hypersynchronous. In this case, the receiving sector will not receive sufficient data, and it will have to fill in the gaps with filler bits which are generally "unintelligible".

The receiving circuit of a subscriber receives, in a given time interval, a number of bits which is different from the number transmitted by its correspondent.

It will be said then that the network does not comply with the integrity of the bit rate of the message. This does not affect normal PCM phonic links where certain samples of speech may be skipped or repeated without altering the intelligibility of the message between the disturbances. However, for links which are scrambled from end to end, the loss of bit rate integrity means that the encoded message is shifted away from the decoding key, causing a total loss of intelligibility.

SUMMARY OF THE INVENTION

The object of the present invention is a method to remedy this loss of intelligibility which results from a disturbance by restricting it to an acceptable period of time. This method should be capable of being applied to links framed according to the CEPT standard as well as other standards such as, for example, the RITA standard.

According to the invention, which applies to transmissions by frames of several time intervals, the bits of useful information are multiplexed, during transmission, with at least one cyclical bit, in synchronism with the data for which, upon arrival, it is sought to regenerate the number of bits transmitted during each time interval, the said cyclical signal bit being called a "marker" and possessing a structure by which the start of its cycle can be unambiguously identified.

BRIEF SUMMARY OF THE DRAWINGS

The present invention will be better understood from the following detailed description of a mode of embodiment taken as a non-exhaustive example and illustrated by the appended drawings of which.

DESCRIPTION OF THE PREFERRED EMBODIMENT

The present invention is used in plesiosynchronous communications networks in which the digitalized data (speech and other miscellaneous data) are transmitted in a temporal medium called a frame, which comprises time intervals, the number of bits contained in a time interval and the number of time intervals per frame varying according to the standards applied.

According to the CEPT standard, a frame comprises 32 time intervals of eight bits each. According to the RITA standard, the frame comprise 24 time intervals of six bits each.

The bit rate possible in each time interval is 64 k bits/s per CEPT frame, and 48 k bits/s per RITA frame.

In a homogeneous digital network, the order of the bits is invariant. The bits can therefore be made to play independent roles and, consequently, to multiplex several sub-channels in one and the same time interval.

As a non-exhaustive example, to connect a CEPT network with a RITA network, an interface called a "bridge" is used. In the CEPT-to-RITA direction, only six bits per time interval of the CEPT frame can be transmitted through this interface, the other two bits being lost. In the RITA-to-CEPT direction, six of the eight bits of the time interval of the CEPT frame are significant, the two additional bits being either insignificant or redundant.

Furthermore, certain systems can be used to coalesce (or combine) several consecutive time intervals to form only one channel with a data transfer rate which is a multiple of the basic rate.

Only a very brief description is given below of the marker processing circuits on the transmitting side of a plesiosynchronous communications network, since these circuits are trivial per se and can be easily adapted by the specialist to the alternative embodiments which he might choose, depending on the characteristics of the said network.

Figure 1:
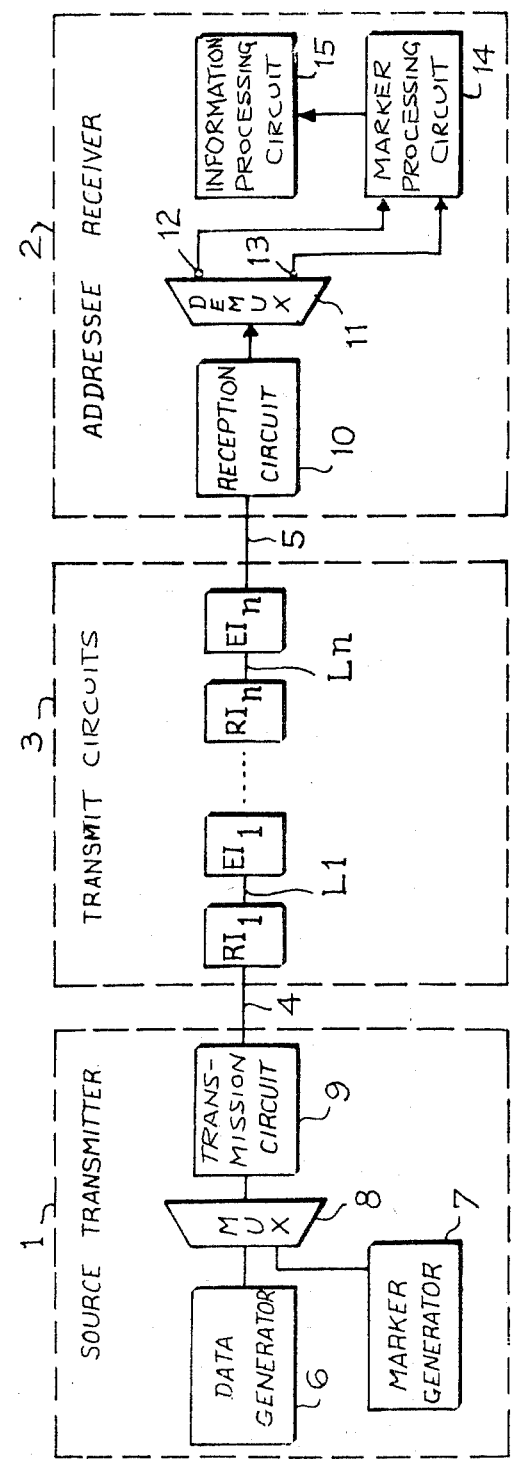
FIG. 1 is a block diagram of a network according to the invention.

The circuits depicted schematically in FIG. 1 comprise a source transmitter 1 linked to an addressee receiver 2 by transit circuits 3, the set of elements 1 to 3 forming a part or the totality of a plesiosynchronous network.

The transit circuits 3 may comprise several intermediate circuits $RI_1$ to $RI_n$ which work together with several intermediate transmitters $EI_1$ to $EI_n$ through links L1 to Ln provided by cables, directional radio links etc., and there are similar links 4,5 linking the elements 1 and 2 to the element 3.

The source transmitter 1 comprises essentially a data generator 6 and a marker generator 7 linked to a multiplexer 8 the output of which is linked by a transmission circuit to the link 4. The generator 6 digitalizes, if necessary, the useful signals which it receives from various analog sources and constitutes frames, each time interval of which comprises, in a preferred mode of embodiment of the invention, two bit positions reserved for the markers introduced into the multiplexer 8 by the generator 7, and B positions for the useful signals. The marker generator 7 and the multiplexer 8 are, of course, synchronized, by means which are not depicted and are obvious to the specialist, with the frames of the generator 6. The marker generator 7 is a generator of fixed or changing binary sequences, the construction of which is obvious to the specialist. The transmission circuit 9 is a circuit which is capable of sending the link 4 the frames that come from the multiplexer 8. It is, for example, a telephonic transmission circuit for a link 4 by cable telephone.

The addressee receiver 2 comprises a reception circuit 10 which is capable of receiving the signals that come through the link 5. It is followed by a demultiplexer 11 which is capable of presenting the useful information signals at an output 12 and the markers introduced by the generator 7 at an output 13. This demultiplexer 11 is, of course, synchronized with the frames received. If the positions of the markers are fixed, the demultiplexer 11 sends the output 13 the bits of all the time intervals which are in these positions. If these positions change, the demultiplexer 11 is also controlled in accordance with the law governing this change, which is obviously the same in the transmitter 1 and the receiver 2. This law of change may, for example, be determined by a pseudo-random sequence generator, its corresponding generator being set in the receiver 2. The sequence used can further exhibit cryptological qualities, i.e. it will not be possible to reproduce the sequence without knowledge of an encoding key and it will not be possible to calculate this key on the basis of a sample in the sequence. The outputs 12 and 13 of the demultiplexer 11 are linked to a marker processing circuit 14 which will be described below with reference to FIG. 2. This circuit 14 is linked to an information-processing circuit 15 which corresponds to the generator 6 of the transmitter 1. This circuit 15 processes the useful information bits of the time intervals received to restore this information, if necessary, after digital-analog conversion.

Figure 2:
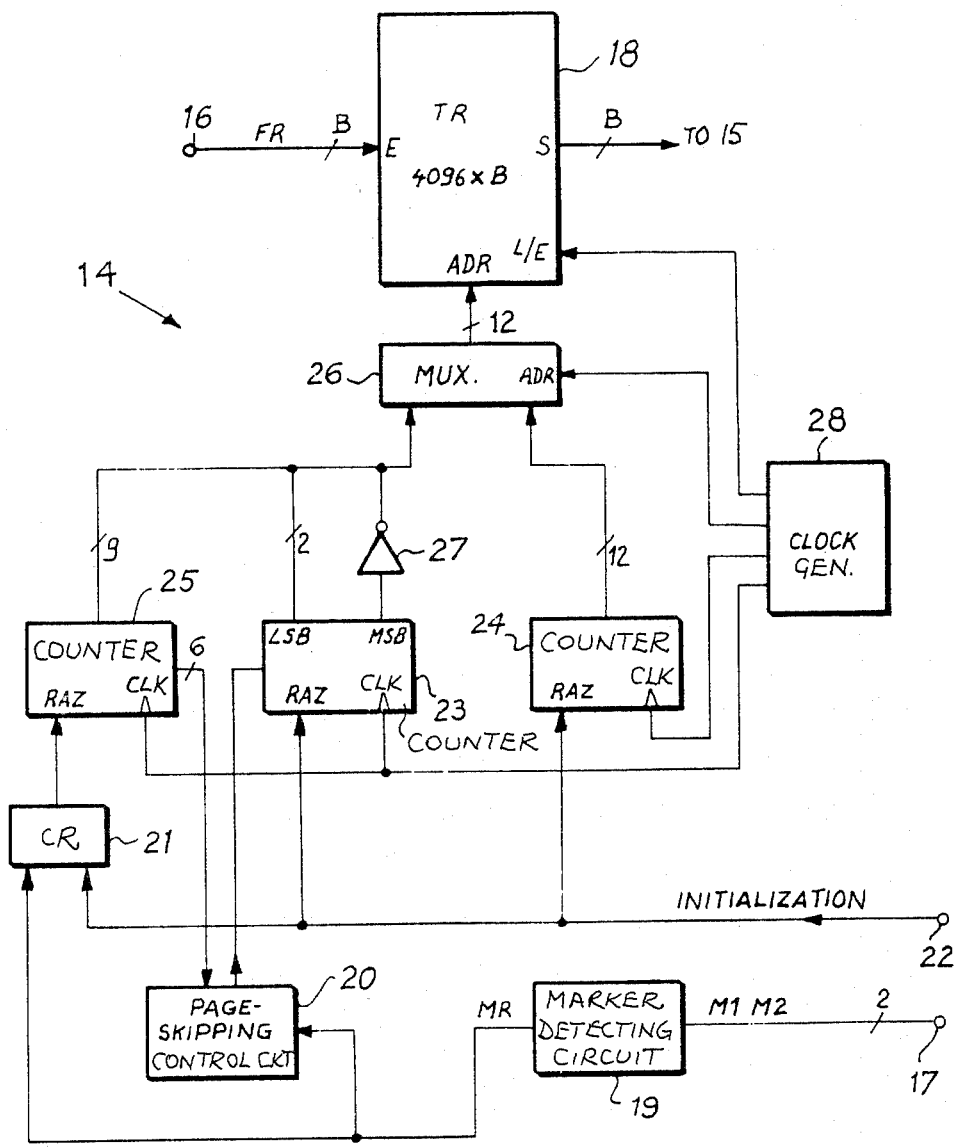
FIG. 2 is a block diagram of a marker processing circuit which uses the method of the invention.

The circuit 14, which is depicted in greater detail in FIG. 2, comprises an input terminal 16 linked to the output 12 of the demultiplexer 11, and an input terminal 17 linked to the output 13 of this multiplexer.

The input 16 is linked to the input of a random-access memory 18 which, in the present case, has a capacity of $4,096 \times B$ bits. The output of the memory 18 is linked to the circuit 15.

The terminal 17 is linked to a marker-detecting (code comparator) circuit 19, the output of which is linked to a page-skipping control circuit 20 and to an input of an OR circuit bearing the reference 21.

The circuit 14 also has a terminal 22 to which an active edge of an initialization signal is sent from circuits not depicted in the figure, when starting up or at the start of reception of a communication, in a way known in itself. The terminal 22 is linked to the second input of the circuit 21 as well as to the zeroizing inputs of a page-writing counter 23 and a reading addresses counter 24. The output of the circuit 21 is linked to the zeroizing input of a line-writing counter circuit 25.

The circuit 14 further comprises a multiplexer 26, to the input of which are linked, on the one hand, the output of the counter 25, the two least significant wires and, in a preferred mode of embodiment of the invention, the most significant wire of the output of the counter 23 via an inverter 27 (in the present case, the output of the counter 23 comprises three wires as eight "pages" of writing are provided for) and, on the other hand, to the output of the counter 24. In the present case, the output of the counter 25 comprises nine wires which represent the least significant portion of the twelve-wire link to the multiplexer 26, the most significant wires of which come from the counter 23. The output of 24 comprises, of course, twelve wires.

The output of the multiplexer 26 is linked to the addressing input of the memory 18. A clock signals generating circuit 28 is linked to the read/write control input of the memory 18, to the control input of the multiplexer 26 and to the clock signal inputs of the counters 23 to 25. The output of the counter 25 is linked to the input of the circuit 20, the output of which is linked to the counting input of the counter 23. The circuit 28 is synchronized with the frames received.

Figure 3:
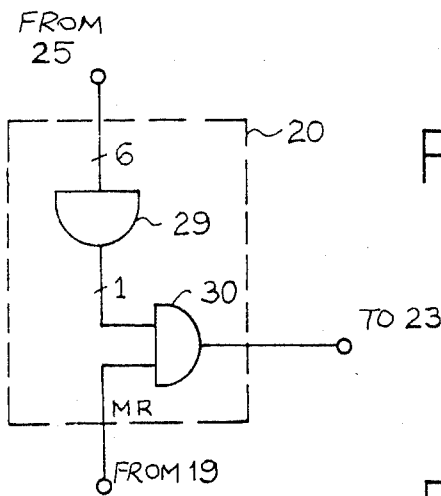
FIGS. 3, 4 and 5 are block diagrams of details of the embodiment of the circuits depicted in FIG. 2.

FIG. 3 depicts a mode of embodiment of the page-skipping control logic circuit 20. It comprises an AND gate bearing the reference 29, with six inputs in the present case, these six inputs being linked to the most significant wires of the output of the counter 25. The output of the gate 29 is linked to an input of another AND gate 30 with two inputs, the other input of which is linked to the output of the circuit 19. The output of the gate 30 is linked to the counter 23. When this output is in the binary state "1", it permits the counter 23 to go forward under the action of the clock signal H.

Figure 4:
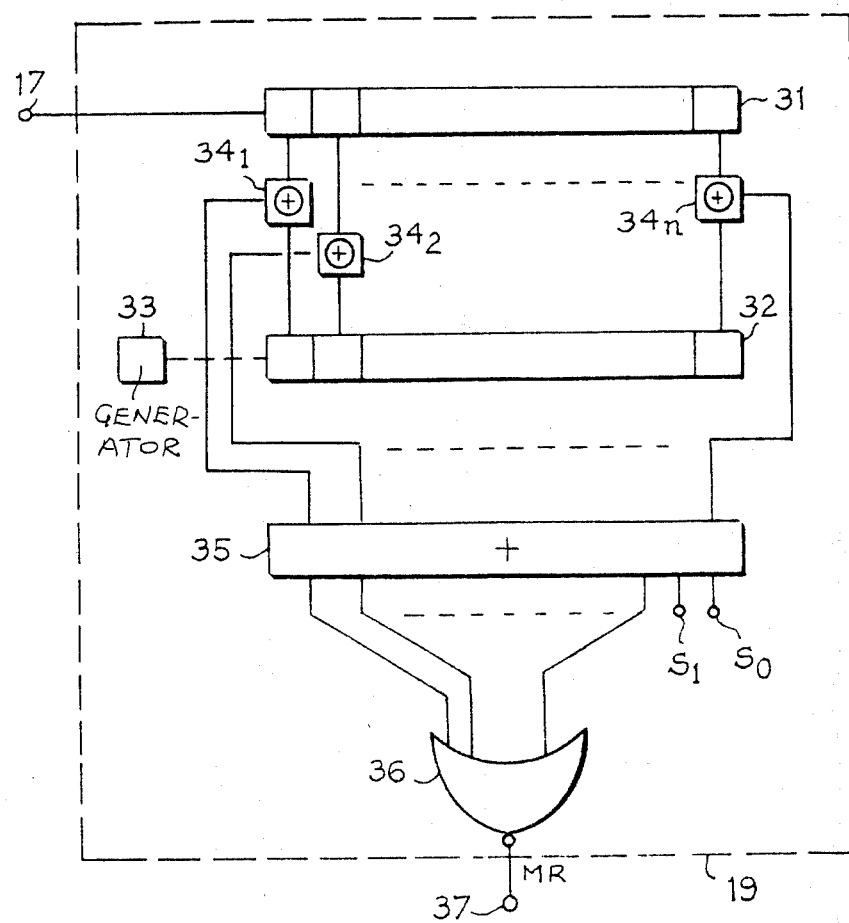

FIG. 4 is the block diagram of an example of an embodiment of the circuit 19. The terminal 17 is linked to the series input of a shift register 31 or that of an analog circuit, such as a random-access memory for example, the capacity n of which equals at least the number of bits needed to identify the marker of a cycle. The circuit 19 comprises a second register 32 which is identical to the register 31 and which is initialized with the marker code given by the generator 33 similar to the generator 7 of the source transmitter. The output of each of the n cells of the register 31 is linked to an initial input of an exclusive-OR gate $34_1$ to $34_n$ respectively, each second input of which is linked to an output of a corresponding cell of the register 32. Should the marker code have a fixed structure, the register 32 becomes unnecessary and the second input of the gates $34_1$ to $34_n$ will be carried to the appropriate logic level by direct cabling. The outputs of the gates $34_1$ to $34_n$ are linked to the inputs of an adder 35. The bit available at the output of the adder represents the distance of Hamming between the code present in the register 31 and the reference marker. In the circuit of FIG. 4 all the outputs, except the least significant outputs $S_O$ and $S_1$ of the adder 35 are linked to NOR gate 36, the output of which is linked to a terminal 37 which constitutes the output terminal of the circuit 19. This terminal is therefore in the state "1" so long as the distance of Hamming is less than 4.

The choice of the markers is not restricted solely to the bit sequences. A marker character may comprise any number whatever of bits transmitted within the same time interval of the frame, occupying fixed or variable positions (according to a known law) of the transmitting and receiving ends. If, in a composite transmission network, time intervals according to CEPT standards are used for certain sections and time intervals according to RITA standards are used for other sections, it will not be possible to use the bit positions which are abandoned in the CEPT-to-RITA "bridge" (interface) for the CEPT time intervals.

In a particular example of an embodiment, we can take two fixed bits $M_2$ and $M_2$ forming a "dibit" which can assume the values "1" and "2" (01 and 10 respectively in binary notation). The marker cycle consists of a succession of "dibits" "1" and "2". The reception of a "0" or a "3" will reflect a transmission error. The reverse situation ("0" or "3" instead of "1" or "2") is also possible.

Since the markers are inserted at the input of the network (in the transmitter 1) in synchronism with the message which it is sought to regenerate the number of bits sent upon arrival (in the receiver 2), the interval between the starting of consecutive marker cycles undergoes the same alterations and is lengthened or shortened in the same way as the useful binary data flow.

To restore the same number of bits at the output of the network as at the input, it suffices to:

(1) Ensure the integrity of the number of marker cycles. This condition is fulfilled if the marker cycle is long enough before the duration of the frame and if the start of the cycle is not made undetectable through the loss of binary integrity and/or errors due to poor transmission in the network, (2) Ensure the restoration in each marker cycle of the same number of bits as at the input. If these bits are the same at the output as at the input, the output bit rate is intelligible. If the passage through the network has caused a shift in the plesiosynchronism, the bit rate becomes unintelligible until a fresh start of the marker cycle makes it possible to "pick up the thread" of the transmission.

The useful binary data flow coming to the terminal 16 is recorded in the buffer memory 18 comprising several "pages", each of which contains a certain number of "lines". The capacity of this memory corresponds to the binary data flow transmitted during one marker cycle. In the present case, the memory 18 comprises eight pages of 512 lines each, with each line containing B bits giving a total capacity, as indicated above, of 4096×B bits.

The writing and reading in the memory 18 are controlled by the clock 28 which is itself synchronized with the incoming frames. The writing addresses are given by the counters 25 and 23, and the reading addresses by the counter 24 which is independent of the two preceding counters. The reading addresses move forward cyclically without any break in sequence. It is therefore at the reading stage that the bit is re-justified according to the detection of the marker cycles. The detection of the start of the cycle sets up the MR signal (at the output of the circuit 19) which should cause the counter 23 to skip to a page start. This MR signal zeroizes the counter 25. The end of the cycle of this counter 25 makes the counter go forward by one page. Similarly, when the MR signal arrives slightly ahead of the end of the counter 25 cycle, it makes the counter 23 skip to the start of the following page.

By contrast, when the MR signal arrives slightly after the end of the counter 25 cycle, it should not cause a second skipping of a page.

To meet these page-skipping conditions, the three least significant wires of the counter 25 output, for example, are overlooked and the "AND" condition is set up on the other wires (gate 29). Thus, the gate 30, which enables the MR signal to reach the counter 23 is on only when the six most significant bits of the counter 25 output (i.e. from line 504 to 511—last line—of the counter 25) are all at "1".

If the marker is not identified, i.e. in the absence of the MR signal, the two counters 25 and 23 continue their development.

At the start of a communication, the counter 24 is zeroized and designates the line "0" of the page "0". The writing address is initialized at the line "0" of the page "4" (upon the transmission of an initialization signal, the counter 23 is indeed zeroized, but owing to the presence of the logic inverter 27 at its most significant output $2_2 = 4$, it sends the value "4" as a page address to the memory 18). This makes it possible to take both a hypersynchronism and a hyposynchronism in the network into account at the start of the communication. The data read in the first three pages of the memory 18 are then unintelligible.

The criteria which determine the choice of the marker are: precise temporal identification at the start of the cycle, sound resistance to deterioration due to the network, compatibility with the networks passed through (especially as regards the disparity of the binary "1"s and "0"s), easy detection and swift recovery of binary integrity after disturbances.

Thus, in one mode of embodiment, it was decided to insert two marker bits M1 and M2 into each time interval at the binary positions 2 and 4 for the CEPT standard and the RITA standard.

So that it can be recognized whether a shifted marker is ahead or behind, its cycle must last more than twice the short cycle. The selected cycle durations are hence the result of a compromise between two contradictory requirements.

The code transmitted in a marker cycle should be easy to produce and identify; it should unambiguously define the starting frame of the cycle even in the presence of disturbances due to transmission errors and plesiosynchronism, and it should have a low probability of accidental imitation by error packets.

In a first example of an embodiment, the marker has a cycle of 512 dibits. It is made up of 506 "2's followed by six "1"s. The start of the cycle is identified by the successive observation of the sequence:

... 222111111222 ...

Figure 5:
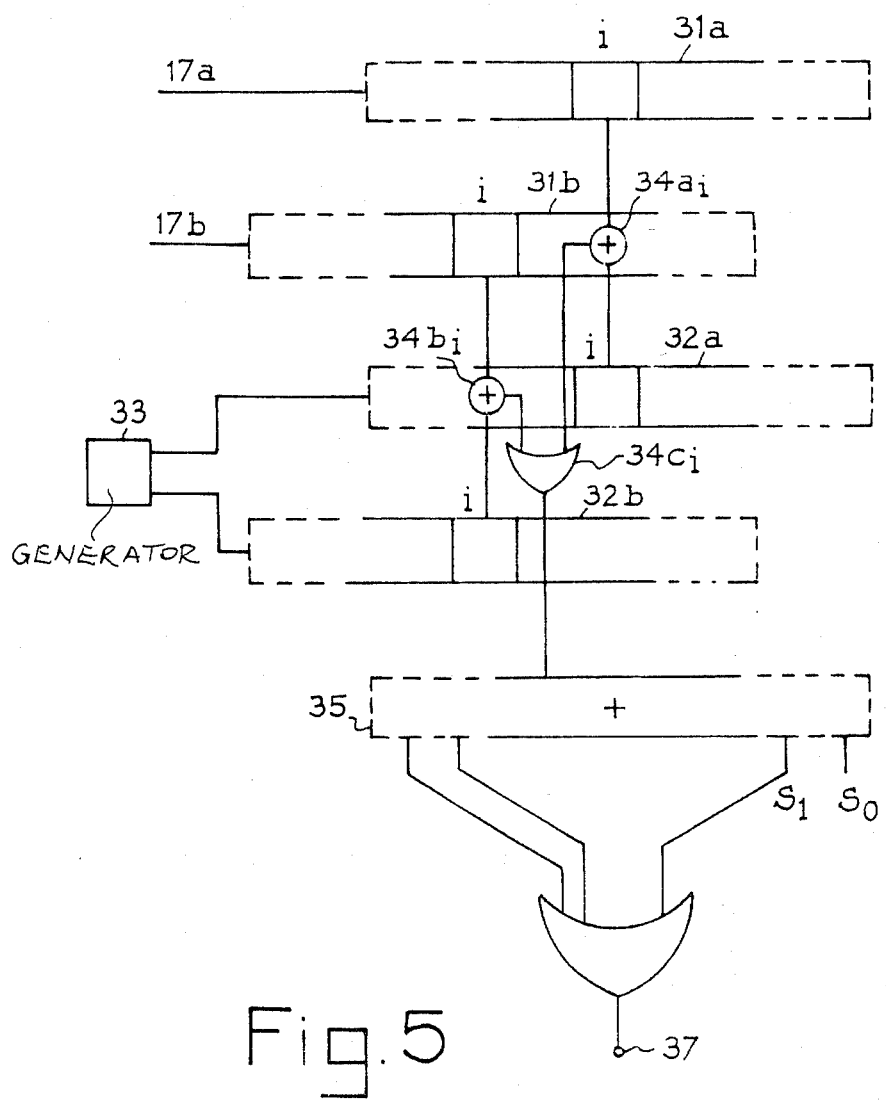

It is very easy to identify this marker by a simple condition of combinatorial logic in a window of twelve figures. An example of a logic identification circuit, well-known in the prior art, is depicted in FIG. 5. This circuit is similar to the one in FIG. 4, but the registers 31 and 32 have been duplicated at 31a, 31b, 32a, 32b, to store the two bits of each dibit separately; the exclusive-OR gates too are duplicated at 34a, 34b to compare each bit of a dibit separately and to input an OR gate 34c giving a single result for the entire dibit.

The distance of Hamming is increased by one unit for each error and by two units for each shift. The identification of the marker is obtained even in the presence of a transmission error, overlooking the least significant output SO of the adder 35.

The distance of Hamming between a marker and a shifted marker can be increased either by increasing the number of symbols contained in the window of comparison (but this would amount to complicating the logic identification condition) or by optimizing the sequence of symbols contained in the window.

In a second example of a mode of embodiment, the sequence of seven dibits is used (between oblique strokes) =

... 222/1112212/222 ...

The distance of Hamming resulting from any shift whatever, ranging from $-3$ to $+3$, is 4 at the minimum. This is what is used in the circuit of FIG. 5. It is also possible to overlook the output $S_1$ of the adder 35, making it possible to identify the marker in the presence of two transmission errors.

What is claimed is:

1. A method for the end-to-end regeneration of binary integrity in a link set up through a plesiosynchronous network, comprising the steps of:

transmitting frames consisting of several time intervals from a transmitter over said link;

multiplexing useful data bits with at least one cyclical signal marker bit in synchronism with said data bits to form said frames being transmitted;

receiving said frames from said link at a receiver;

demultiplexing said received frames to separate said useful data bits and said cyclical signal marker bits;

unambiguously identifying the start of a cycle of said cyclical signal bit and detecting errors from the identification of said cyclical signal marker bits; and regenerating the bits transmitted utilizing errors detected from the identification of the cyclical signal marker bits.

2. Method according to the claim 1, wherein the marker bit is multiplexed at fixed positions of the time interval.

3. Method according to the claim 1, wherein the marker bit is multiplexed at positions which change in time according to determined parameters.

4. Method according to the claim 1, wherein the marker bit is multiplexed at positions which change in time according to parameters which can be determined.

5. Method according to any one of claims 1-4, wherein the marker bit is a "dibit".

6. Method according to the claim 5, wherein the only values used for the "dibit" are "1" and "2", the reception of a "0" or a "3" reflecting a transmission error.

7. Method according to the claim 5, wherein the only values used for the dibit are "0" and "3", the reception of a "1" or a "2" reflecting a transmission error.

8. Method according to the claim 6, wherein the marker sequence is made up of a fixed number of "1"s and "2"s.

9. Method according to the claim 7, wherein the marker sequence is made up of a fixed number of "0"s and "3"s.

10. Method according to one of the claims 5, wherein the marker bit has a cycle comprising a long succession of identical dibits cut by a determined sequence of some different dibits.

11. The method according to claim 1, further comprising the step of determining the distance of Hamming between the received signal and a reference signal in identifying a marker bit when this distance is less than a predetermined value, said value being that which can result from a shift in sequence.

12. A device for the regeneration of binary integrity in a link set up through a plesiosynchronous network which transmits frames of several time intervals comprising:

a source transmitter for transmitting over said link;

a bit cyclical signal generator for producing marker signals having a bit cycle;

a multiplexer connected to said bit cyclical signal generator in said source transmitter for multiplexing said marker signals with data bits;

an addressee receiver including a demultiplexer for receiving signals from said source transmitter or said link;

said demultiplexer for separating said data bits and said marker signal;

a marker processing device connected to the demultiplexer for identifying the start of said bit cycle and regenerating said data bits according to the detection of said start.

13. Device according to the claim 12, wherein the marker processing device comprises a buffer memory which receives the useful information bits from the demultiplexer, a marker detector receiving the marker information bits from the demultiplexer, the output of this detector being linked to the zeroizing input of a first writing counter and to the input of a "page-skipping" logic circuit set between the output of the first counter and the input of a second "page" writing counter, a reading counter, these three counters being linked through a multiplexer to the addressing input of the buffer memory, and a clock signals generator synchronized with the frames received and linked to the clock inputs of the three counters referred to above and to the read/write control input of the buffer memory.

14. Device according to the claim 13, wherein the "page-skipping" logic circuit comprises a first AND gate linked to the output of the first counter, the output of this gate being linked to an input of a second AND gate, another input of which is linked to the output of the marker detector, the output of the second AND gate being linked to the second counter and wherein the first AND gate is linked to the most significant wires of the output of the first counter.

15. Device according to any one of the claims 12, 13 and 14, wherein the marker detector is based on the determination of the distance of Hamming between the sequence received and a reference sequence, the marker being identified when this distance is less than the smallest value which can result from a shift in sequence.

16. Device according to any one of the claims 12, 13 and 14 to 15, comprising an initialization signal input linked to the zeroizing inputs of the three counters referred to above, the link to the zeroizing input of the first counter being made through an OR gate, another input of which is linked to the output of the marker detector.

17. Device according to the claim 16, wherein the most significant output of the second counter is linked via a logic inverter to the input of the multiplexer.

* * * * *